US011944963B2

(12) United States Patent
Tao et al.

(10) Patent No.: US 11,944,963 B2
(45) Date of Patent: Apr. 2, 2024

(54) SLIDING REMOVABLE COAXIAL CAPILLARY MICROFLUIDIC CHIP AND PREPARATION METHOD THEREFOR

(71) Applicant: DALIAN UNIVERSITY OF TECHNOLOGY, Liaoning (CN)

(72) Inventors: Shengyang Tao, Liaoning (CN); Shi Feng, Liaoning (CN); Wenbo Yang, Liaoning (CN)

(73) Assignee: DALIAN UNIVERSITY OF TECHNOLOGY, Liaoning (CN)

( * ) Notice: Subject to any disclaimer, the term of this patent is extended or adjusted under 35 U.S.C. 154(b) by 0 days.

(21) Appl. No.: 18/257,829

(22) PCT Filed: Apr. 14, 2021

(86) PCT No.: PCT/CN2021/087194
§ 371 (c)(1),
(2) Date: Jun. 15, 2023

(87) PCT Pub. No.: WO2022/126946
PCT Pub. Date: Jun. 23, 2022

(65) Prior Publication Data

US 2024/0042429 A1 Feb. 8, 2024

(30) Foreign Application Priority Data

Dec. 17, 2020 (CN) ........................ 202011501839.5

(51) Int. Cl.
*B01L 3/00* (2006.01)

(52) U.S. Cl.
CPC ..... *B01L 3/502707* (2013.01); *B01L 2200/10* (2013.01); *B01L 2300/0861* (2013.01); *B01L 2300/12* (2013.01); *B01L 2300/165* (2013.01)

(58) Field of Classification Search
CPC ........... B01L 3/502707; B01L 2200/10; B01L 2300/0861; B01L 2300/12; B01L 2300/165
See application file for complete search history.

(56) References Cited

U.S. PATENT DOCUMENTS

2013/0052100 A1 2/2013 Claeys et al.
2015/0122651 A1 5/2015 Baret et al.

FOREIGN PATENT DOCUMENTS

CN 2297729 Y 11/1998
CN 103706414 A 4/2014
(Continued)

OTHER PUBLICATIONS

Espacenet English Machine Translation of CN110394203. (Year: 2019).*

*Primary Examiner* — Jennifer Wecker
*Assistant Examiner* — Kathryn Elizabeth Limbaugh
(74) *Attorney, Agent, or Firm* — Muncy, Geissler, Olds & Lowe, P.C.

(57) ABSTRACT

A sliding removable coaxial capillary microfluidic chip and a preparation method therefor. The chip comprises a substrate which has a hole as a window; an alignment platform I and II are respectively fixed on both sides of the window, and the alignment platform I is internally provided with a circular groove I and a square groove I formed successively on the same axis; the alignment platform II is internally provided with a circular groove II and a square groove II formed successively on the same axis; both ends of a square capillary are respectively placed in the square groove I and II, one circular capillary enters the square groove I through the circular groove I, one end of another circular capillary is placed in a sliding platform, and the other end slides through the sliding platform and enters the square groove II through the circular groove II.

9 Claims, 4 Drawing Sheets

(56) References Cited

FOREIGN PATENT DOCUMENTS

| | | | |
|---|---|---|---|
| CN | 103816881 | A | 5/2014 |
| CN | 103946694 | A | 7/2014 |
| CN | 103949875 | A | 7/2014 |
| CN | 105572207 | A | 5/2016 |
| CN | 207102563 | U | 3/2018 |
| CN | 208005529 | U | 10/2018 |
| CN | 110192056 | A | 8/2019 |
| CN | 110394203 | A | 11/2019 |
| CN | 110433882 | A | 11/2019 |
| CN | 110665555 | A | 1/2020 |
| CN | 112517096 | A | 3/2021 |
| CN | 112619721 | A | 4/2021 |

* cited by examiner

SLIDING REMOVABLE COAXIAL CAPILLARY MICROFLUIDIC CHIP AND PREPARATION METHOD THEREFOR

TECHNICAL FIELD

The present invention belongs to the technical field of microfluidic chips, and particularly relates to a sliding removable coaxial capillary microfluidic chip and a preparation method therefor.

BACKGROUND

Coaxial glass capillary microfluidic chips are a kind of widely used microcapsule production devices. Among which, capsules with a core-shell structure have been widely used because of the special structure thereof, and have wide application prospects from drug coating and controlled release of nutrients, to rapid detection of trace liquid, molecular capture, fluorescence detection and display, etc. A coaxial glass capillary microfluidic chip device is composed of two circular capillaries with conical heads, which are coaxially arranged in a square capillary and separated from each other by a certain distance. If the two circular capillaries are not coaxial, it is not possible to produce a capsule with a core-shell structure. In the process of manufacture, it requires a lot of practice to accurately align the two circular capillaries in the square capillary, and the manufacture is complicated and easy to fail. In addition, when liquid flows in a prepared chip, if the chip is disturbed or blocked by an unfiltered foreign matter in the liquid, the liquid cannot flow normally, so that the chip is scrapped and cannot be used any longer, and it is necessary to manufacture a new chip. Moreover, after the circular capillaries are coaxially arranged in the square capillary, if the relative distance between the two circular capillaries is not suitable, it is also not possible to produce a qualified capsule with a core-shell structure. In a traditional chip manufacture process, epoxy glue is usually used for fixing, the two circular capillaries cannot be moved, and the relative distance cannot be adjusted. If the experiment fails, it is also necessary to manufacture a new chip.

Therefore, improving the existing design and preparation process of coaxial glass capillary microfluidic chips will have a significant application value for the production of core-shell microcapsules.

In the present invention, 3D printing technology is used to creatively design an accessory with a sliding groove structure, which not only ensures the accurate coaxial arrangement in the square capillary, but also realizes the removable and repeated use of the chip. Therefore, the chip can be removed to clean the blockage even when the chip is blocked. In addition, the relative distance between the two circular capillaries with conical heads can be adjusted, which improves the operability of the experiment. The use of epoxy glue is reduced, the steps of assembling the chip are simplified, and a high standard coaxial glass capillary microfluidic chip can be prepared without a lot of practice. The method of the present invention has high repeatability and requires no further processing, which improves the quality of the microfluidic chip manufactured and paves a way for subsequent experiments.

SUMMARY

To solve the problems in the prior art, the present invention provides a sliding removable coaxial capillary microfluidic chip and a preparation method therefor.

To achieve the above purpose of the present invention, the present invention adopts the following technical solution:

The present invention provides a coaxial capillary microfluidic chip, comprising two circular capillaries and one square capillary, and further comprising:

A substrate which has a hole as a window;

An alignment platform I which is internally provided with a circular groove I and a square groove I formed successively on the same axis;

An alignment platform II which is internally provided with a circular groove II and a square groove II formed successively on the same axis;

A sliding platform which comprises a sliding base, wherein a fixed tube is fixed on the sliding base for the circular capillaries to pass through;

A sliding groove is formed on one side of the alignment platform II on the substrate, and the sliding groove is matched with the base of the sliding platform, so that the sliding platform can move on the sliding groove; and The alignment platform I and the alignment platform II are respectively fixed on both sides of the window in the substrate; both ends of the square capillary are respectively placed in the square groove I and the square groove II, one circular capillary enters the square groove I through the circular groove I, one end of the other circular capillary is placed in the fixed tube, and the other end enters the square groove II through the circular groove II.

In the above technical solution, further, a lug boss is arranged outside the alignment platform II on the side close to the circular groove II, and a fixing hole I is formed in the lug boss for accommodating a sealed tube; preferably, a seal gasket is removably fixed on the lug boss, and a fixing hole II is formed in the seal gasket; the fixing hole I and the fixing hole II are coaxial with the circular groove II; the inner diameter of the fixing hole I is matched with the outer diameter of the sealed tube used, and the inner diameters of the sealed tube and the fixing hole II are matched with the outer diameters of the circular capillaries.

In the above technical solution, further, a hole I with internal threads is formed in the alignment platform I on the side close to the circular groove I; a hole II and a hole III with internal threads are respectively formed in both ends of the fixed tube, and a circular groove III is formed inside the fixed tube to make the hole II and the hole III communicated; the inner diameters of the hole I, the hole II and the hole III are matched with back taper joints used, and the back taper joints used are matched with the circular capillaries; the inner diameter of the circular groove III is matched with the outer diameter of one circular capillary.

In the above technical solution, further, a liquid inlet hole I is formed in the top of the alignment platform I and is in communication with the square groove I; a liquid inlet hole II is formed in the top of the alignment platform II and is in communication with the square groove II; the inner diameters of the liquid inlet hole I and the liquid inlet hole II are matched with back taper joints used.

In the above technical solution, further, the window is located in the center of the substrate, and the window is a rectangular hole used for observing the alignment of the two circular capillaries in the square capillary.

In the above technical solution, further, the alignment platform I and the alignment platform II are cuboid; after the length of the alignment platform I satisfies the fixing of the circular capillaries, the ends of the circular capillaries extend out of the alignment platform I; as a minimum, the lengths of the alignment platform II and the sliding platform as well as the distance between the alignment platform II and the sliding platform satisfy that: the sliding of the sliding platform makes the circular capillaries move within the scope of the window in the square capillary.

In the above technical solution, further, a slot I and a slot II are formed in the opposite sides of the alignment platform I and the alignment platform II, and fixers are respectively placed in the slot I and the slot II to fix the square capillary; the fixers are cylinders and matched with the sizes of the slots.

The present invention also provides a preparation method for the coaxial capillary microfluidic chip, comprising the following steps:

(1) Drawing and printing: drawing the substrate, the alignment platforms and the sliding platform with a drawing software; and printing with 3D printing technology;
(2) Grinding the circular capillaries: grinding one end of each circular capillary into a desired conical head;
(3) Installing and fixing: fixing both ends of the square capillary respectively in the square groove I and the square groove II; placing the ground end of one circular capillary in the square groove I through the circular groove I, exposing the ground end to the center of the window, and placing the unground end of the other circular capillary in the fixed tube; and
(4) Adjusting position: pushing the sliding platform to approach the alignment platform I, placing the ground end of the circular capillary in the square groove II through the circular groove II, and adjusting the relative distance between the two circular capillaries by sliding the sliding platform to align the circular capillaries coaxially in the square capillary.

In the above technical solution, further, in step (3), both ends of the square capillary are respectively fixed in the slot I and the slot II, then the fixers are placed in the slots to fix the square capillary, and epoxy glue is used for further sealing.

In the above technical solution, further, in step (3), the unground ends of the two circular capillaries are first placed in casing tubes and then placed in the back taper joints respectively, the back taper joint of one circular capillary is screwed into the hole I, the ground end is placed in the square groove I through the circular groove I, and the back taper joint of the other circular capillary is screwed into the holeII; the sliding platform is pushed to make the ground end of the other circular capillary enter the circular groove II through the sealed tube in the fixing hole I, and finally placed to an appropriate position in the square groove II.

Compared with the prior art, the present invention has the following beneficial effects:

With the arrangement of the alignment platforms in the chip of the present invention, the coaxial and accurate alignment of the capillaries can be realized easily without repeated practice, which improves the quality and the manufacture efficiency of the chip; and with the arrangement of the sliding platform in the chip, the distance between the two circular capillaries can be adjusted flexibly.

The chip of the present invention is removable, and the circular capillaries can be removed conveniently and used again after dredging even when the chip is blocked. The capillaries can also be thoroughly cleaned after use, and even be modified to change a hydrophilic surface into a hydrophobic surface without the need of manufacturing a new chip.

Each accessory in the chip of the present invention can be manufactured in a large quantity, and the method of the present invention has high repeatability and requires no further processing, which saves the time cost during assembly.

The material of the chip of the present invention is cheap, the preparation method is simple and feasible, and a variety of materials, such as plastic, metal and polymer materials, can be used as the substrate of the chip.

Figure 1:
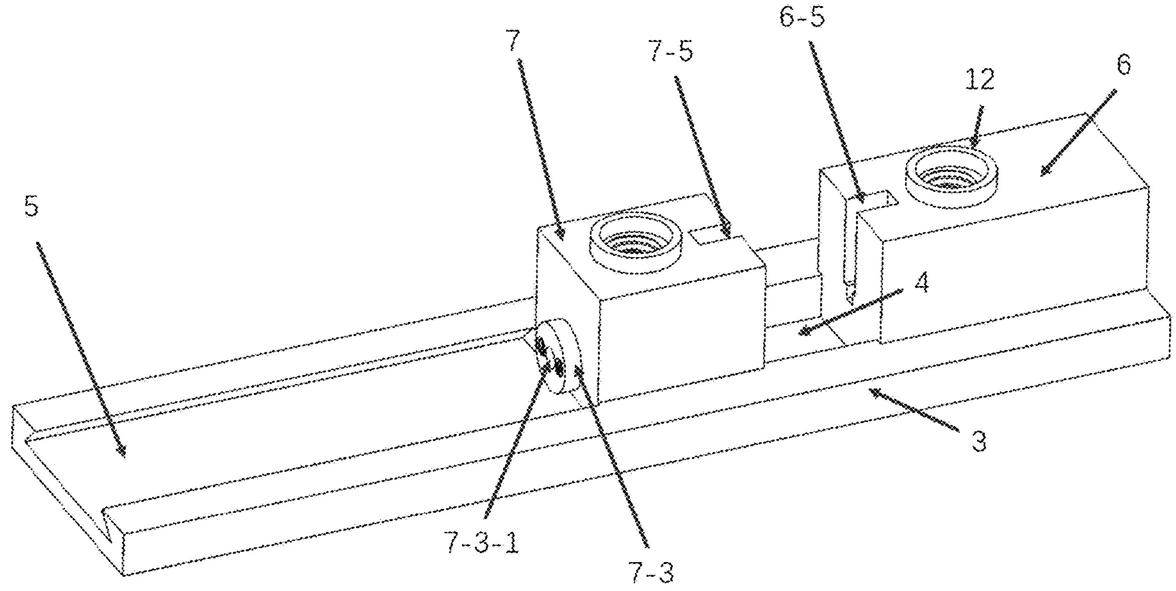
FIG. 1 is a structural schematic diagram of a chip of the present invention.
Figure 2:
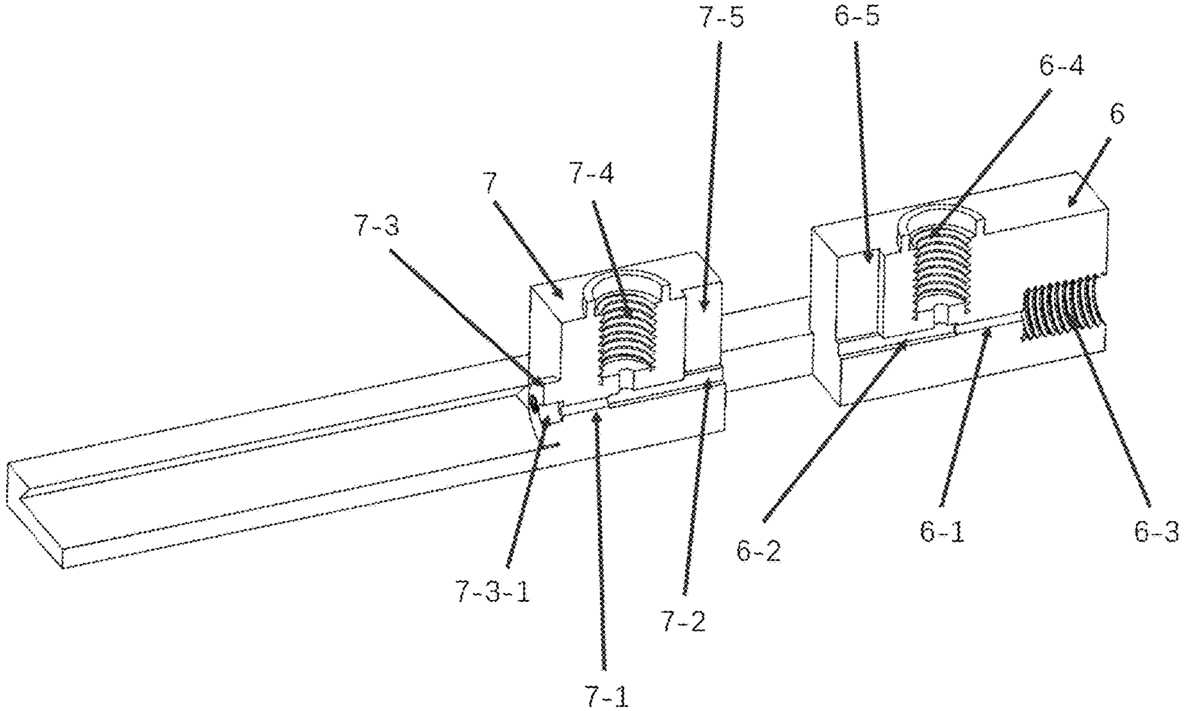
FIG. 2 is an internal sectional view of a chip of the present invention.
Figure 3:
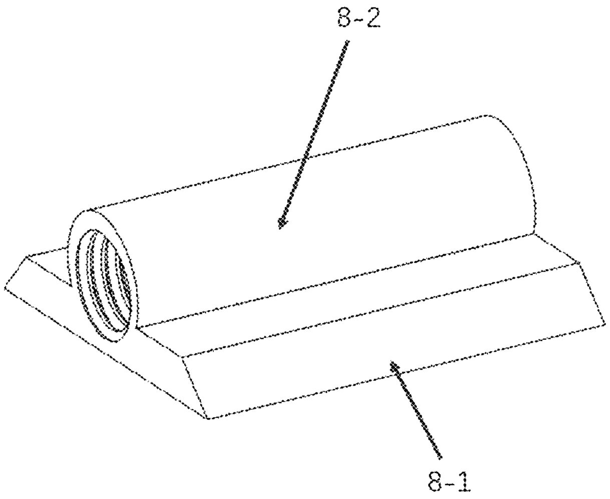
FIG. 3 is a structural schematic diagram of a sliding platform.
Figure 4:
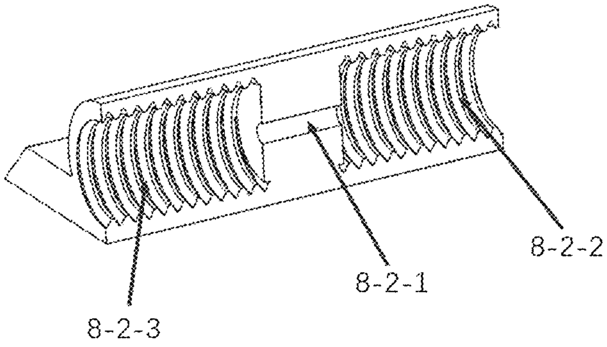
FIG. 4 is a sectional view of a sliding platform.
Figure 5:
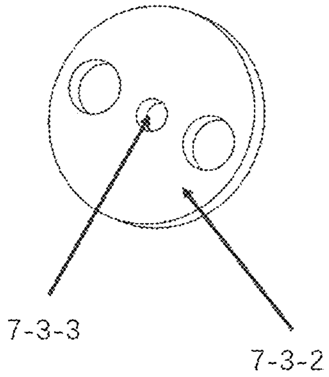
FIG. 5 is a structural schematic diagram of a seal gasket.
Figure 6:
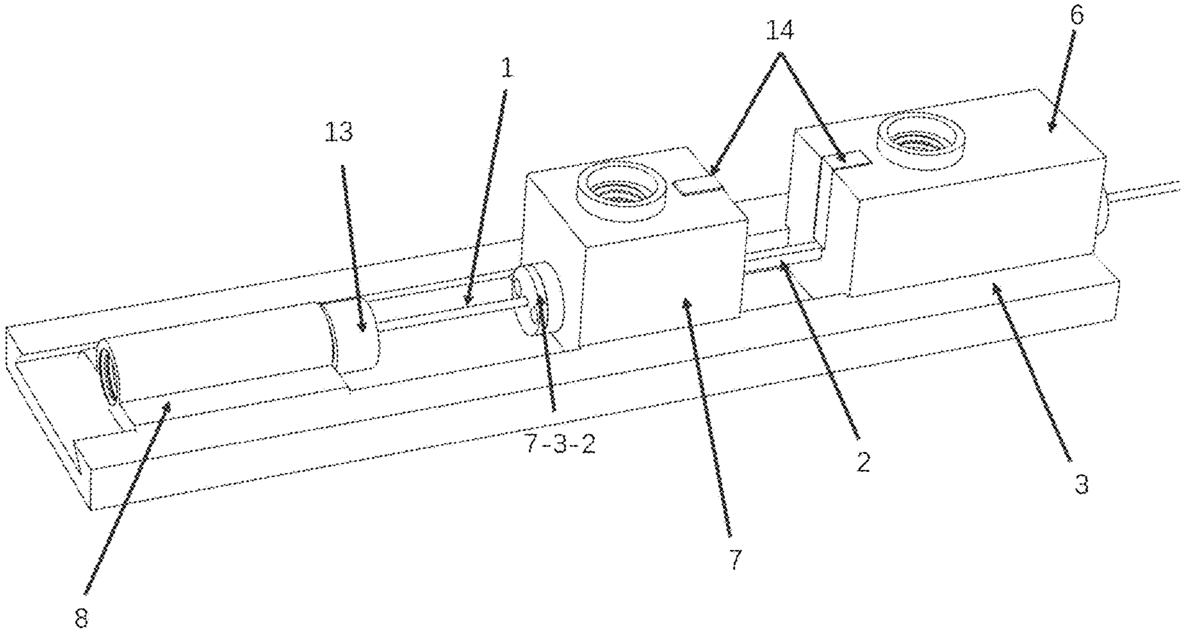
FIG. 6 is an overall structural schematic diagram of a chip of the present invention with a sliding platform.
Figure 7:
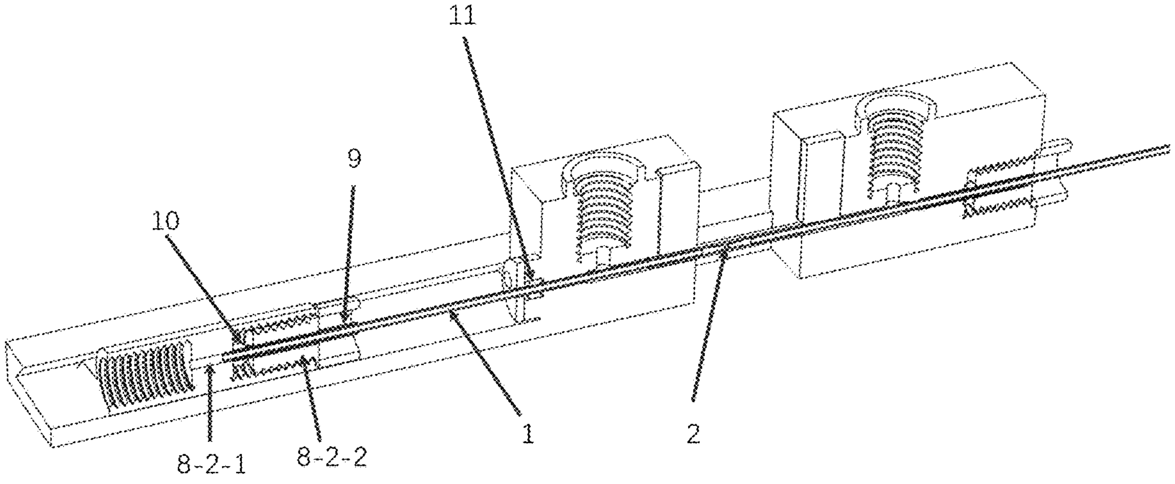
FIG. 7 is an overall structural sectional view of a chip of the present invention with a sliding platform.
Figure 8:
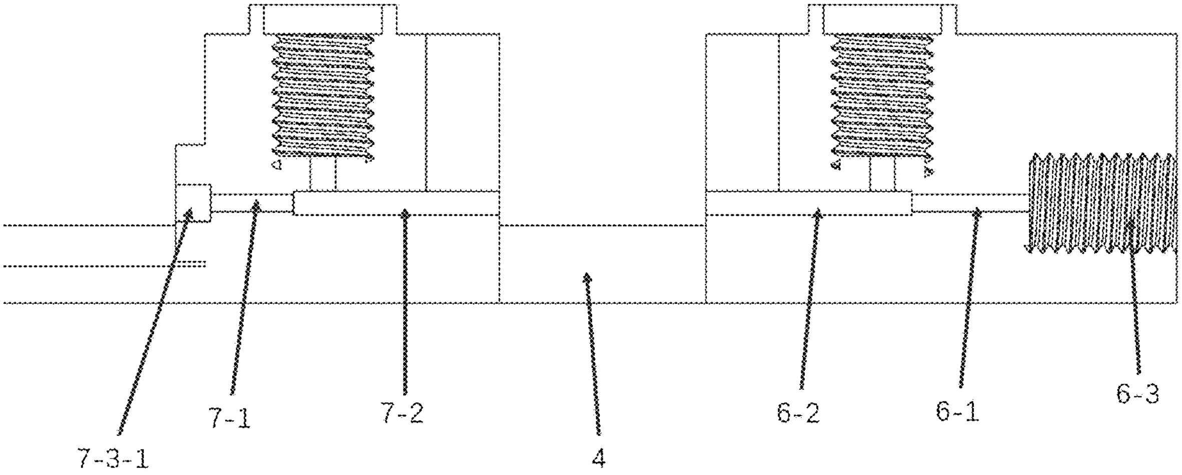
FIG. 8 is a sectional view of two alignment platforms.

In the figures: 1 circular capillary, 2 square capillary, 3 substrate, 4 window, 5 sliding groove, 6 alignment platform I, 6-1 circular groove I, 6-2 square groove I, 6-3 hole I, 6-4 liquid inlet hole I, 6-5 slot I, 7 alignment platform II, 7-1 circular groove II, 7-2 square groove II, 7-3 lug boss, 7-3-1 fixing hole I, 7-3-2 seal gasket, 7-3-3 fixing hole II, 7-4 liquid inlet hole II, 7-5 slot II, 8 sliding platform, 8-1 sliding base, 8-2 fixed tube, 8-2-1 circular groove III, 8-2-2 hole II, 8-2-3 hole III, 9 casing tube, 10 annular cutting edge, 11 sealed tube, 12 protection ring, 13 back taper joint, and 14 fixer.

DETAILED DESCRIPTION

The present invention will be further described below in detail in combination with specific embodiments, but will not be limited in any way.

Embodiment 1

A coaxial capillary microfluidic chip, comprising two circular capillaries (1) and one square capillary (2), and further comprising: a substrate (3), an alignment platform I (6), an alignment platform II (7) and a sliding platform (8); the substrate has a rectangular hole as a window (4); and the window is located in the center of the substrate and is used for observing the alignment of the two circular capillaries in the square capillary.

The alignment platform I is cuboid and has a hole I (6-3) with internal threads on one side; the alignment platform I is internally provided with a circular groove I (6-1) and a square groove I (6-2) formed successively on the same axis; and a liquid inlet hole I (6-4) is formed in the top of the alignment platform I and is in communication with the square groove I (6-2).

The alignment platform II (7) is cuboid and is internally provided with a circular groove II (7-1) and a square groove II (7-2) formed successively on the same axis; a liquid inlet hole II (7-4) is formed in the top of the alignment platform II (7) and is in communication with the square groove II (7-2); the inner diameters of the liquid inlet hole I (6-4) and the liquid inlet hole II (7-4) are matched with back taper joints used; and liquid inlet hole I and the liquid inlet hole II are provided with protection rings (12).

A lug boss (7-3) is arranged outside the alignment platform II (7) on the side close to the circular groove II (7-1), and a fixing hole I (7-3-1) is formed in the lug boss for accommodating a sealed tube; a seal gasket (7-3-2) is removably fixed on the lug boss (7-3), and a fixing hole II (7-3-3) is formed in the seal gasket (7-3-2); the fixing hole I (7-3-1) and the fixing hole II (7-3-3) are coaxial with the circular groove II (7-1); the inner diameter of the fixing hole I (7-3-1) is matched with the outer diameter of the sealed tube used; and the inner diameters of the sealed tube and the fixing hole II (7-3-3) are matched with the outer diameters of the circular capillaries. After being placed in the fixing hole I (7-3-1), the sealed tube is fixed by the seal gasket (7-3-2).

A slot I (6-5) and a slot II (7-5) are formed in the opposite sides of the alignment platform I and the alignment platform II, and fixers are respectively placed in the slot I and the slot II to fix the square capillary; and the fixers are cylinders and matched with the sizes of the slots.

The sliding platform (8) comprises a sliding base (8-1), wherein a fixed tube (8-2) is fixed on the sliding base for the circular capillaries to pass through; a hole II (8-2-2) and a hole III (8-2-3) with internal threads are respectively formed in both ends of the fixed tube (8-2), and a circular groove III (8-2-1) is formed inside the fixed tube (8-2) to make the hole II (8-2-2) and the hole III (8-2-3) communicated; the inner diameters of the hole I (6-3), the hole II (8-2-2) and the hole III (8-2-3) are matched with back taper joints used, and the back taper joints used are matched with the circular capillaries; and the inner diameter of the circular groove III (8-2-1) is matched with the outer diameter of one circular capillary. A sliding groove (5) is formed on one side of the alignment platform II (7) on the substrate (3), and the sliding groove (5) is matched with the base (8-1) of the sliding platform, so that the sliding platform can move on the sliding groove.

The alignment platform I (6) and the alignment platform II (7) are respectively fixed on both sides of the window (4) in the substrate (3). Both ends of the square capillary are respectively placed in the square groove I (6-2) and the square groove II (7-2), one circular capillary enters the square groove (6-2) through the circular groove I (6-1), one end of the other circular capillary is placed in the fixed tube (8-2), and the other end enters the square groove (7-2) through the circular groove II (7-1).

Embodiment 2

The substrate material used for preparing the coaxial capillary microfluidic chip can be plastic, metal, polymer material, etc. In this embodiment, plastic substrate is selected, and the preparation method is as follows:

(1) Drawing and printing: drawing the substrate, the alignment platform I, the alignment platform II, the sliding platform and the fixers with a drawing software; and printing with 3D printing technology;

(2) Grinding the circular capillaries: using a glass needle tube fabricator to gradually taper circular borosilicate capillaries to a desired diameter, and using a glass microelectrode (needle tube) grinder to grind the capillaries into conical needles. Cleaning and drying the obtained conical glass capillaries to remove residual glass particles. Soaking the capillaries in a solution of 30% $H_2O_2$ and 98% $H_2SO_4$ with a ratio of 3:7, then cleaning the capillaries with air and ethanol, and processing with octadecyltrimethoxysilane for 1 minute to make the capillaries hydrophobic for use;

(3) Installing and fixing: fixing both ends of a square borosilicate capillary respectively in the square groove I (6-2) and the square groove II (7-2), then placing the fixers in the slots to fix the square capillary, and using epoxy glue for further sealing;

Placing the unground ends of the circular capillaries first in FEP casing tubes, extending the unground ends of the circular capillaries about 4 mm from the casing tubes, then placing the unground ends of the circular capillaries in the back taper joints, screwing the back taper joint of one circular capillary into the hole I (6-3), fixing the unground end of the circular capillary in the hole I (6-3) with an annular cutting edge, placing the ground end of the circular capillary in the circular groove I (6-1), and exposing the conical point of the ground end to the center of the window; using the same method to fix the unground end of the other circular capillary in the hole II (8-2-2), forming a sealed structure by the FEP casing tube and the hole II (8-2-2), making the ground end of the other circular capillary pass through the sealed tube and enter the circular groove II (7-1) through the fixing hole I (7-3-1), and finally placing the ground end to an appropriate position in the square groove II (7-2); and (4) Adjusting position: pushing the sliding platform 8 to approach the alignment platform I 7, fixing the sealed tube in the fixing hole I (7-3-1) to form a sealed structure with the circular groove II (7-1), and fixing the seal gasket (7-3-2) on the lug boss (7-3) with screws; and adjusting the relative distance (usually 80 microns) between the two circular capillaries by sliding the sliding platform to align the circular capillaries coaxially in the square capillary.

Embodiment 3

According to the preparation method of the present invention, the substrate, and the alignment platforms and the sliding platform of the chip can be prepared in batches in advance for use. When an experiment is needed to be carried out, the circular glass capillaries are ground and placed in the square capillary to be aligned coaxially according to the method in embodiment 2, and the relative distance between the two circular capillaries is adjusted by an aligner and a receiver.

When used, the back taper joints are respectively screwed into the two liquid inlet holes and the hole III (8-2-3) of the sliding platform. A test is carried out after liquid enters, and a microcapsule is obtained from the hole I (6-3).

During the experiment, when the relative positions of two capillaries need to be adjusted, the relative positions of the two circular capillaries can be adjusted by pushing the sliding platform.

When the capillaries are blocked, the capillaries, the sealed tube and the casing tubes can be removed, dredged, cleaned and used again.

The invention claimed is:

1. A coaxial capillary microfluidic chip, comprising two circular capillaries and one square capillary, and further comprising:

a substrate which has a hole as a window;

an alignment platform I which is internally provided with a circular groove I and a square groove I formed successively on the same axis;

an alignment platform II which is internally provided with a circular groove II and a square groove II formed successively on the same axis;

a sliding platform which comprises a sliding base, wherein a fixed tube is fixed on the sliding base for the circular capillaries to pass through;

a sliding groove is formed on one side of the alignment platform II on the substrate, and the sliding groove is matched with the sliding base of the sliding platform, so that the sliding platform can move on the sliding groove;

the alignment platform I and the alignment platform II are respectively fixed on both sides of the window in the substrate; both ends of the square capillary are respectively placed in the square groove I and the square groove II, one circular capillary enters the square groove I through the circular groove I, one end of the other circular capillary is placed in the fixed tube, and the other end slides through the sliding platform and enters the square groove II through the circular groove II;

as a minimum, the lengths of the alignment platform II and the sliding platform as well as the distance between the alignment platform II and the sliding platform satisfy that: the sliding of the sliding platform makes the circular capillaries move within the scope of the window in the square capillary; and the window is located in the center of the substrate, and the window is a rectangular hole used for observing the alignment of the two circular capillaries in the square capillary.

2. The coaxial capillary microfluidic chip according to claim 1, wherein a lug boss is arranged outside the alignment platform II on the side close to the circular groove II, and a fixing hole I is formed in the lug boss for accommodating a sealed tube; a seal gasket is removably fixed on the lug boss, and a fixing hole II is formed in the seal gasket; the fixing hole I and the fixing hole II are coaxial with the circular groove II; the inner diameter of the fixing hole I is matched with the outer diameter of the sealed tube used, and the inner diameters of the sealed tube and the fixing hole II are matched with the outer diameters of the circular capillaries.

3. The coaxial capillary microfluidic chip according to claim 2, wherein a hole I with internal threads is formed in the alignment platform I on the side close to the circular groove I; a hole II and a hole III with internal threads are respectively formed in both ends of the fixed tube, and a circular groove III is formed inside the fixed tube to make the hole II and the hole III communicated; the inner diameters of the hole I, the hole II and the hole III are matched with back taper joints used, and the back taper joints used are matched with the circular capillaries; the inner diameter of the circular groove III is matched with the outer diameter of one circular capillary.

4. The coaxial capillary microfluidic chip according to claim 3, wherein a liquid inlet hole I is formed in the top of the alignment platform I and is in communication with the square groove I; a liquid inlet hole II is formed in the top of the alignment platform II and is in communication with the square groove II; the inner diameters of the liquid inlet hole I and the liquid inlet hole II are matched with back taper joints used.

5. The coaxial capillary microfluidic chip according to claim 4, wherein the alignment platform I and the alignment platform II are cuboid; when the length of the alignment platform I results in the fixing of the circular capillaries, the ends of the circular capillaries will extend out of the alignment platform I.

6. The coaxial capillary microfluidic chip according to claim 5, wherein a slot I and a slot II are formed in the opposite sides of the alignment platform I and the alignment platform II, and fixers are respectively placed in the slot I and the slot II to fix the square capillary; the fixers are cylinders and matched with the sizes of the slots.

7. A preparation method for the coaxial capillary microfluidic chip according to claim 6, comprising the following steps:

(1) drawing and printing: drawing the substrate, the alignment platforms and the sliding platform with a drawing software; and printing with 3D printing technology;

(2) grinding the circular capillaries: grinding one end of each circular capillary into a desired conical head;

(3) installing and fixing: fixing both ends of the square capillary respectively in the square groove I and the square groove II; placing the ground end of one circular capillary in the square groove I through the circular groove I, exposing the ground end to the center of the window, and placing the unground end of the other circular capillary in the fixed tube; and (4) adjusting position: pushing the sliding platform to approach the alignment platform I, placing the ground end of the other circular capillary in the square groove II through the circular groove II, and adjusting the relative distance between the two circular capillaries by sliding the sliding platform to align the circular capillaries coaxially in the square capillary.

8. The preparation method for the coaxial capillary microfluidic chip according to claim 7, wherein in step (3), both ends of the square capillary are respectively fixed in the slot I and the slot II, then the fixers are placed in the slots to fix the square capillary, and epoxy glue is used for further sealing.

9. The preparation method for the coaxial capillary microfluidic chip according to claim 7, wherein in step (3), the unground ends of the two circular capillaries are first placed in casing tubes and then placed in the back taper joints respectively, the back taper joint of one circular capillary is screwed into the hole I, the ground end is placed in the square groove I through the circular groove I, and the back taper joint of the other circular capillary is screwed into the hole II; the sliding platform is pushed to make the ground end of the other circular capillary enter the circular groove II through the sealed tube in the fixing hole I, and finally placed to an appropriate position in the square groove II.

* * * * *